(12) United States Patent
Fang

(10) Patent No.: US 12,031,338 B2
(45) Date of Patent: *Jul. 9, 2024

(54) PVC COMPOSITE MATERIAL, FOAM BOARD, AND FLOORING

(71) Applicant: FLOORING INDUSTRIES LIMITED, SARL, Bertrange (LU)

(72) Inventor: Qinghua Fang, Zhejiang Province (CN)

(73) Assignee: UNILIN BV, Wielsbeke (BE)

(*) Notice: Subject to any disclaimer, the term of this patent is extended or adjusted under 35 U.S.C. 154(b) by 0 days.

This patent is subject to a terminal disclaimer.

(21) Appl. No.: 15/056,235

(22) Filed: Feb. 29, 2016

(65) Prior Publication Data

US 2016/0177579 A1    Jun. 23, 2016

Related U.S. Application Data

(63) Continuation-in-part of application No. 14/305,807, filed on Jun. 16, 2014, now Pat. No. 9,527,975.

(30) Foreign Application Priority Data

Mar. 21, 2014   (CN) .......................... 201410106959.3

(51) Int. Cl.
*E04F 15/10*        (2006.01)
*B32B 3/06*         (2006.01)
(Continued)

(52) U.S. Cl.
CPC .............. *E04F 15/107* (2013.01); *B32B 3/06* (2013.01); *B32B 5/18* (2013.01); *B32B 27/065* (2013.01);
(Continued)

(58) Field of Classification Search
CPC ....... B32B 5/18; B32B 27/065; B32B 27/304; B32B 2266/0235; B32B 2250/02;
(Continued)

(56) References Cited

U.S. PATENT DOCUMENTS 4,071,790 A * 1/1978 Darby ...................... H02K 9/10
                                                310/59
4,138,521 A * 2/1979 Brown ................... D06N 7/006
                                                428/159
(Continued)

FOREIGN PATENT DOCUMENTS

CN       102040785 A  *  5/2011 ......... B29C 48/0022
CN       102321318 A     1/2012
(Continued)

OTHER PUBLICATIONS

Translation of CN 102492244, Sun Feng, Sep. 18, 2013, p. 1-5.*
(Continued)

*Primary Examiner* — Hai Vo
(74) *Attorney, Agent, or Firm* — Workman Nydegger

(57) ABSTRACT

A polyvinyl chloride polymer (PVC) composite material is described herein. The PVC composite material includes 40-60 parts by weight of PVC, 40-60 parts by weight of calcium carbonate, 0.2-0.6 parts by weight of composite foaming agent, 3-5 parts by weight of foam regulator, 2-4 parts by weight of toughener, 0.8-1.2 parts by weight of lubricant, and 2-3 parts by weight of stabilizer. Meanwhile, the present invention provides a foam board made of the PVC composite material and flooring. The resulting PVC products have a high-strength structure and a good foaming property, bring the comfort to feet as the resilient flooring does, have a satisfied sound reduction and can be easily installed as the hard flooring could.

8 Claims, 3 Drawing Sheets

(51) Int. Cl.
| | |
|---|---|
| *B32B 5/18* | (2006.01) |
| *B32B 27/06* | (2006.01) |
| *B32B 27/08* | (2006.01) |
| *B32B 27/30* | (2006.01) |
| *C08J 9/00* | (2006.01) |
| *C08J 9/08* | (2006.01) |
| *C08J 9/10* | (2006.01) |
| *E04B 5/02* | (2006.01) |
| *E04C 2/20* | (2006.01) |
| *E04C 2/24* | (2006.01) |

(52) U.S. Cl.
CPC ............ *B32B 27/08* (2013.01); *B32B 27/304* (2013.01); *C08J 9/0014* (2013.01); *C08J 9/0023* (2013.01); *C08J 9/0052* (2013.01); *C08J 9/0061* (2013.01); *C08J 9/0066* (2013.01); *C08J 9/0095* (2013.01); *C08J 9/08* (2013.01); *C08J 9/103* (2013.01); *E04C 2/205* (2013.01); *E04C 2/246* (2013.01); *E04C 2/50* (2013.01); *E04F 15/102* (2013.01); *B32B 2250/02* (2013.01); *B32B 2250/246* (2013.01); *B32B 2266/0235* (2013.01); *B32B 2307/102* (2013.01); *B32B 2307/402* (2013.01); *B32B 2307/554* (2013.01); *B32B 2307/56* (2013.01); *B32B 2419/04* (2013.01); *B32B 2471/00* (2013.01); *C08J 2201/03* (2013.01); *C08J 2203/02* (2013.01); *C08J 2203/04* (2013.01); *C08J 2203/18* (2013.01); *C08J 2205/052* (2013.01); *C08J 2327/06* (2013.01); *C08J 2423/06* (2013.01); *C08J 2423/28* (2013.01); *C08J 2433/00* (2013.01); *C08J 2497/02* (2013.01); *Y10T 428/249988* (2015.04)

(58) Field of Classification Search
CPC ........ B32B 2250/246; B32B 2307/402; B32B 2307/554; B32B 2419/04; B32B 2471/00; B32B 27/08; B32B 3/06; B32B 2305/022; B32B 2307/102; B32B 2307/56; B32B 2419/00; B32B 3/26; C08J 9/0066; C08J 9/103; C08J 9/08; C08J 2201/03; C08J 2203/02; C08J 2203/04; C08J 2203/18; C08J 2205/052; C08J 2327/06; C08J 2423/06; C08J 2423/28; C08J 2433/00; C08J 2497/02; C08J 9/0014; C08J 9/0023; C08J 9/0052; C08J 9/0061; C08J 9/0095; C08J 2433/08; C08J 9/127; C08J 9/36; E05Y 2600/45; E05Y 2800/12; E06B 7/2305; E04C 2/205; E04C 2/246; E04C 2/50; E04F 15/102; E04F 15/107; E04F 15/105; Y10T 428/249988

See application file for complete search history.

(56) References Cited

U.S. PATENT DOCUMENTS

| | | | | |
|---|---|---|---|---|
| 4,544,694 | A | * | 10/1985 | Bower ............... C08K 5/09 106/268 |
| 4,599,264 | A | | 7/1986 | Kauffman et al. |
| 5,283,273 | A | * | 2/1994 | Sander ............... C08K 5/07 524/100 |
| 8,171,691 | B1 | * | 5/2012 | Stone ............... B32B 27/065 52/611 |
| 9,006,301 | B2 | | 4/2015 | Leeming et al. |
| 9,527,975 | B2 | * | 12/2016 | Fang ............... B32B 3/26 |
| 2011/0015307 | A1 | * | 1/2011 | Fukushima ........ C08L 23/14 524/13 |
| 2011/0025307 | A1 | | 2/2011 | Koski et al. |
| 2011/0160357 | A1 | * | 6/2011 | Gerster ............ C07C 323/52 549/15 |
| 2014/0329062 | A1 | * | 11/2014 | Song ............... E04F 15/0215 428/201 |
| 2014/0343179 | A1 | | 11/2014 | Raymond et al. |

FOREIGN PATENT DOCUMENTS

| | | | | | |
|---|---|---|---|---|---|
| CN | | 102363664 | A | * | 2/2012 |
| CN | | 102492244 | A | | 6/2012 |
| CN | | 102964740 | A | | 3/2013 |
| CN | | 103865208 | A | | 6/2014 |
| WO | WO 2010049530 | A2 | * | 5/2010 | ............ B29B 7/007 |

OTHER PUBLICATIONS

Translation of CN-102363664-A, Zhu et al., Feb. 29, 2012. (Year: 2012).*

Translation of CN-102040785-A, Teng et al., May 4, 2011. (Year: 2011).*

* cited by examiner

PVC COMPOSITE MATERIAL, FOAM BOARD, AND FLOORING

CROSS-REFERENCE TO RELATED APPLICATIONS

The present application is a Continuation-In-Part of U.S. patent application Ser. No. 14/305,807, filed on Jun. 16, 2014, which claims priority under 35 U.S.C. § 119(a) on Patent Application No(s). 201410106959.3 filed in Republic of China on Mar. 21, 2014.

BACKGROUND OF THE INVENTION

1. Field of the Invention

The present invention relates to a polyvinyl chloride polymer (PVC) board and, more particularly, to a PVC composite material, a foam board, a production method and apparatus thereof, and flooring.

2. Description of the Related Art

Polyvinyl chloride polymer (PVC) foam boards, known as Xuefu boards and Andi boards, contain polyvinyl chloride polymer as the main chemical composition. During production, a mixture of PVC, a foaming agent and the like is foamed at high temperature, the melt is then extruded by an extruder and conveyed into a mold for shaping and cooling, and the profiles after shaped are cut to obtain the desired boards. The existing formulation of materials forming the PVC foam boards has certain disadvantages. For example: (1) the foaming effect is not so adequate and even, thus to fail to achieve the sound reduction due to the use of a single foaming agent; (2) the compositions of the supplementary materials are not so proper, resulting in insufficient strength, hardness and toughness of the boards, thus further shortening the service life of the boards; (3) PVC is likely to be decomposed under light and heat conditions, so the properties of the products are not stable; (4) as the surface of the products is likely to be scratched, the appearance is dissatisfied. Although the existed flooring made of PVC material composes of multi-layers, the layers are melted together into one single instruction by heat. Since the PVC material is a resilient material, the existed flooring is resilient. Due to the flooring being resilient, when the flooring is laid out, the requirements for the subfloor flatness before the installation are much high, which improves the difficulty of installation.

BRIEF SUMMARY OF THE INVENTION

To overcome at least one deficiency in the prior art, the present invention provides a polyvinyl chloride polymer (PVC) composite material, a foam board, a production method and appratus thereof, and flooring, which can effectively improve the quality of PVC board products.

To solve the technique problems as described above, the present invention provides a PVC composite material including 40-60 parts by weight of PVC, 40-60 parts by weight of calcium carbonate, 0.2-0.6 parts by weight of composite foaming agent, 3-5 parts by weight of foam regulator, 2-4 parts by weight of toughener, 0.8-1.2 parts by weight of lubricant, and 2-3 parts by weight of stabilizer.

According to one embodiment of the invention, the PVC composite material may include 45-55 parts by weight of PVC, 45-55 parts by weight of calcium carbonate, 0.2-0.6 parts by weight of composite foaming agent, 3.5-4.5 parts by weight of foam regulator, 2.5-3.5 parts by weight of toughener, 0.9-1.1 parts by weight of lubricant, and 2-3 parts by weight of stabilizer.

According to one embodiment of the invention, the PVC composite material may include 50-60 parts by weight of PVC, 40-50 parts by weight of calcium carbonate, 0.2-0.6 parts by weight of composite foaming agent, 4-5 parts by weight of foam regulator, 3-4 parts by weight of toughener, 1-1.2 parts by weight of lubricant, and 2-2.5 parts by weight of stabilizer.

According to one embodiment of the invention, the PVC composite material may further include a brightening agent or 3-5 parts by weight of plant fiber, and an amount of the brightening agent is no more than 1.5 parts by weight.

According to one embodiment of the invention, an inorganic foaming agent of the composite foaming agent may be sodium bicarbonate, an organic foaming agent of the composite foaming agent may be azodicarbonamide (AC), the toughener may be chlorinated polyethylene (CPE) or polyacrylates (ACR), the lubricant may include stearic acid and polyethylene (PE) wax, the stabilizer may include calcium stearate and zinc stearate, the brightening agent may be titanium oxide, and the plant fiber may be wood flour, bamboo powder, straw powder, or a combination thereof.

In addition, the present invention further provides a PVC foam board made by foaming of the PVC composite material as foregoing described.

Accordingly, the present invention further provides a production method of PVC foam boards, including: a step of uniformly mixing and stirring materials forming the PVC composite material as foregoing described; a step of extruding and discharging including heating and foaming the uniformly mixed materials forming the PVC composite material and then extruding viscous foamed PVC extrudate: a step of shaping and cooling including feeding the foamed PVC extrudate into a mold for shaping and cooling in order to obtain PVC foam profiles; and a step of production of finished products including cutting the discharged PVC foam profiles to finally obtain PVC foam boards as finished products.

Meanwhile, the present invention provides a production apparatus of PVC foam boards. including: a mixing and stirring device, configured to uniformly mix and stir the materials forming the PVC composite material as foregoing described; an extruding and discharging device, configured to heat and foam the uniformly mixed materials forming the PVC composite material and then extrude viscous foamed PVC extrudate; a shaping and cooling device, configured to feed the foamed PVC extrudate into a mold for shaping and cooling in order to obtain PVC foam profiles; and a finished product production device, configured to cut the discharged PVC foam profiles to finally obtain PVC foam boards as finished products.

Further, the present invention further provides flooring, including a PVC layer and a PVC foam layer. The PVC foam layer is made by foaming of the PVC composite material, and the PVC layer is bonded on the surface of the PVC foam layer.

According to one embodiment of the invention, the PVC layer may include a PVC wear-resistance layer and a PVC color film layer. The PVC wear-resistance layer may be hot-pressed onto the PVC color film layer, and the PVC color film layer may be bonded to the PVC foam layer According to one embodiment of the invention, the PVC layer may include a PVC wear-resistance layer, a PVC color film layer, and a PVC substrate layer. The PVC wear-resistance layer, the PVC color film layer, and the PVC substrate layer are hot-pressed together, and the PVC substrate layer is bonded to the PVC foam layer.

According to one embodiment of the invention, the flooring may further include an underlayer, and the underlayer may be disposed at the surface of the PVC foam layer far from the PVC layer.

Compared with the prior art, the present invention optimizes the composition and proportion of the PVC composite material, so that the quality of boards can be improved, as mainly shown in the following aspects: (1) the foaming effect is adequate and even to achieve the sound reduction due to the use of appropriate amount of the composite foaming agent and the foam regulator; (2) due to the proper proportion of the calcium carbonate and the toughener, the strength, hardness and toughness of the boards are advantageously improved; (3) the amount of the stabilizer is optimized, such that the PVC is prevented from being decomposed under adverse conditions, the stability of the materials is improved, and the frequency of removing the mould due to the materials being pasted is greatly reduced; (4) due to the addition of the appropriate lubricant, the products are maintained with good fluidity during the process so as to prevent the surface of the products from being scratched, so the appearance of the products is improved advantageously. Through these measures, the present invention can improve the properties of the products effectively and thus hold a larger market share.

Particularly, the flooring made by the PVC composite material provided by the invention combines the resilient upper layer and the hard lower layer, greatly reducing the requirements for subfloor flatness. The flooring makes the feet feel more comfortable as the resilient flooring does, has a sound reduction, and can be installed more easily as the hard flooring could.

DETAILED DESCRIPTION OF THE INVENTION

Figure 1:
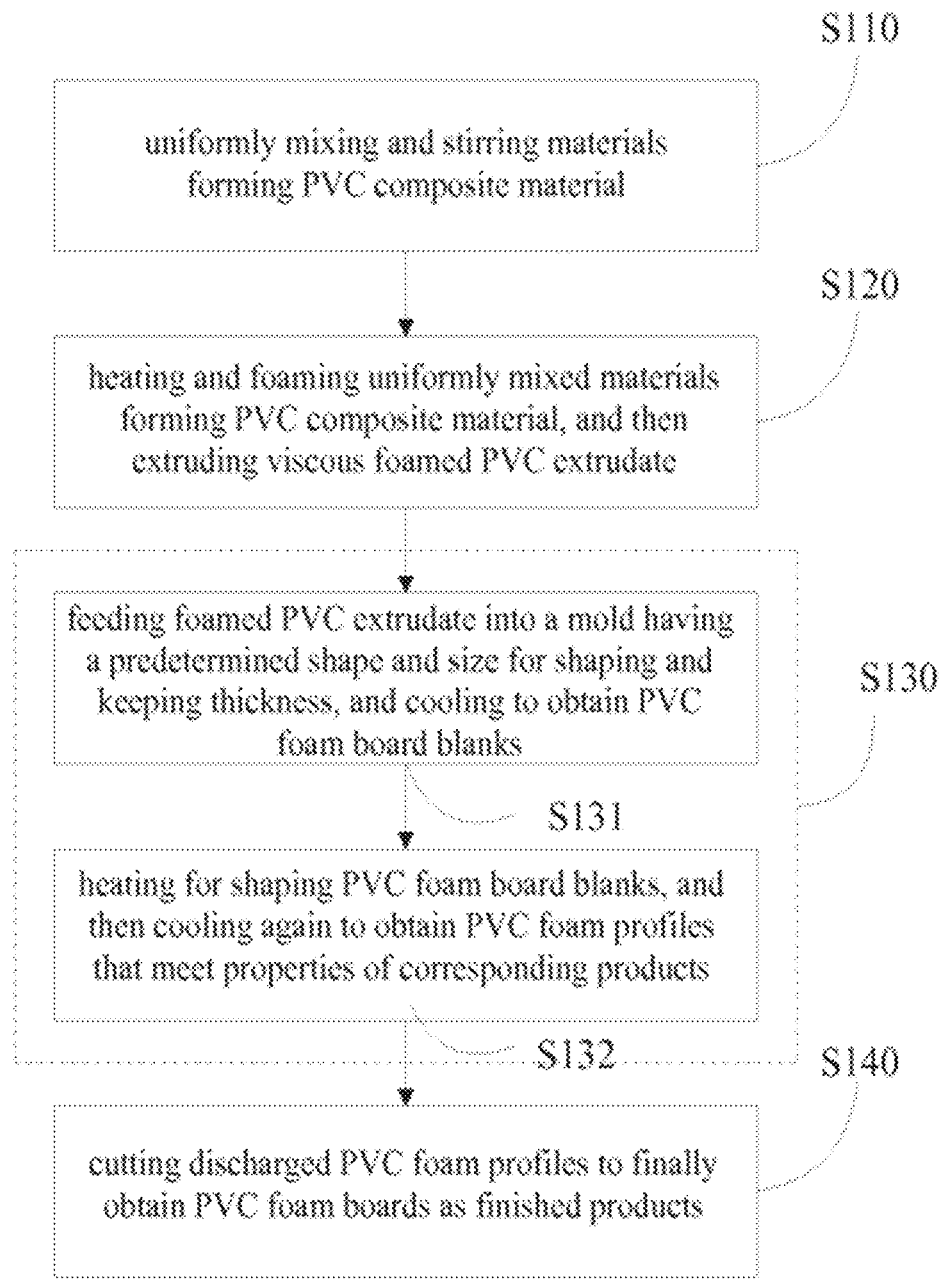
FIG. 1 is a flowchart of a production method of PVC (polyvinyl) chloride polymer) foam bonds according to one embodiment of the present invention.

A polyvinyl chloride polymer (PVC) composite material according to one embodiment of the present invention includes 40-60 parts by weight of PVC, 40-60 parts by weight of calcium carbonate, 0.2-0.6 parts by weight of composite foaming agent, 3-5 parts by weight of foam regulator, 2-4 parts by weight of toughener, 0.8-1.2 parts by weight of lubricant, and 2-3 parts by weight of stabilizer. In addition, a small amount of brightening agent (generally, less than or equal to 1.5 parts by weight) and plant fiber (generally, 3-5 parts by weight) may be added if required. The features and functions of those compositions are described as follows.

As the main thermoplastic resin, PVC is a kind of white powder of amorphous structure (or, particles with Φ8 mm or less than). Without a definite melting point, PVC starts to soften at 80-85° C., becomes highly elastic at 130° C., and starts to become viscous at 160-180° C. Therefore, PVC may be easily plasticization molded by heating.

As a common chemical and building raw material, the calcium carbonate serves as fillers, and the hardness and stability of the material may be thus improved effectively. In the invention, the calcium carbonate can wholly adopt heavy calcium carbonate, adopt the combination of the heavy calcium carbonate and light calcium carbonate, or wholly adopt the light calcium carbonate. The invention is not limited thereto. The heavy calcium carbonate is also called as ground calcium carbonate (GCC), and the light calcium carbonate is also called as precipitated calcium carbonate (PCC). The sedimentation volume of the light calcium carbonate, i.e., 2.4-2.8 ml/g, is far larger than that (1.1-1.9 ml/g) of heavy calcium carbonate prepared mechanically. In the PVC composite material according to embodiments of the present invention, the light calcium carbonate serves as fillers, and the hardness and stability of the material may be thus improved effectively.

The function of the composite foaming agent is to facilitate the formation of bubbles during the heating of the raw materials, thus to form a porous finished product, to finally reduce sound/noise. The composite foaming agent in this embodiment may be selected from some existing products in the market, or formed of an inorganic foaming agent and an organic foaming agent. In a specific composite foaming agent, the ratio of the inorganic foaming agent (for example, calcium bicarbonate, magnesium bicarbonate, sodium bicarbonate or the like) to the organic foaming agent (for example, azoic compounds, sulphonyl hydrazine compounds, nitro compounds or the like) is about ½-1. In the more specific case, the composite foaming agent includes 0.6±0.1 parts by weight of the organic foaming agent AC (azodicarbonamide) as an activator and 0.8±0.1 parts by weight of the sodium bicarbonate as the endothermic inorganic foaming agent. In this case, on one hand, the burst decomposition of AC is improved, and on the other hand, it is easier to prepare a desired foaming agent. The use of such an improved composite foaming agent helps to increase the efficiency of foaming and to ensure that the foam is more delicate and uniform.

The weight of the composite foaming agent in the invention is 0.2-0.6 parts. When the weight of the composite foaming agent is added more than 0.6 parts, the density of the manufactured PVC foam board will decrease to be less than 0.8 g/cm$^3$, and the corresponding intensity of the board, the locking strength, and the dimensional stability of the board will all decrease.

The foam regulator, as an acrylate processing aid, is resilient resin. The main function of the foam regulator in the materials of the present invention is to facilitate the plasticization of PVC, to enhance the strength of PVC melt and avoid foams from merging or breaking, and to ensure the melt to have good fluidity and improve the surface glossiness of the product. In embodiments of the present invention, the foam regulator may be foam regulator of 530 series (ZD530, LS530, BZ530, PA530, etc., specifically referring to the product introductions of JINHASS and other companies). The foam regulator is able to increase the pressure and torque of the PVC melt, to thus effectively increase the cohesion and homogeneity of the PVC melt and to make the resulting PVC products more compact.

The toughener is a substance used for enhancing the toughness of the composite material layer. As a plasticization processing aid, the main function of the toughener is to enhance the toughness and shock resistance of the product. In this embodiment, the toughener may be CPE (chlorinated polyethylene) or otherwise ACR (polyacrylates).

The main function of the lubricant, as internal lubricant, is to lubricate the contact surface of the composite material to further make it have better fluidity, in order to avoid scratching the products. The lubricant may be formed of stearic acid and PE (polyethylene) wax, where the two components may be prepared in a proportion of approximately equal amount (0.8-1:0.8-1). The lubricant may also accelerate the melting of PVC, improve the strength and homogeneity of the melt, reduce the fracture and exudation of the melt, and have no obvious adverse effects on the mechanical property of PVC.

The stabilizer is mainly used for slowing down the reaction of the substance, maintaining the chemical equilibrium, reducing surface tension, and preventing photolysis and thermolysis, oxygenolysis or the like. In the present invention, the main function of the stabilizer is to inhabit the decomposition of PVC, thus to ensure the quality of the product. In the embodiments of the present invention, the stabilizer may be a metal soap stabilizer. Specifically, the stabilizer may be prepared from calcium stearate and zinc stearate in a proportion of approximately equal amount (0.8-1:0.8-1). In the invention, the weight of the stabilizer is 2-3 parts. If the weight of the stabilizer is less than 2 parts, when the PVC composite material or the PVC foam board is manufactured, the continuous operating period of the manufacturing apparatus can last only one week. The weight of the stabilizer in the PVC composite material in the invention is improved. The continuous operating period of the manufacturing apparatus can be extended from one week to two week, improving the stability of the materials and greatly reducing the frequency of removing the mould due to the pasted materials, which greatly improves the manufacture efficiency and reduces the maintenance costs.

The brightening agent, also referred to as optical brightening agent or fluorescent brightening agent, is an optional raw material. The main function of the brightening agent is to make the product have the better appearance. In this embodiment, the brightening agent may be titanium oxide, the main component of which is $TiO_2$ and which may improve the properties of the product and may reduce the use cost of materials in comparison with other brightening agents.

Other auxiliary agents, i.e., 3-5 parts of plant fiber supplementary materials such as straw powder, wood flour, bamboo flour, or a mixture thereof, may be added. On the one hand, the auxiliary agents may enhance the foaming effect and improve the density, resilience and toughness of the product, and on the other hand, the auxiliary agents contribute to the reduction of the comprehensive cost of materials.

The above embodiments optimize the composition and proportion of the PVC composite material, mainly as shown in the following aspects: (1) the foaming effect is adequate and even to achieve the sound reduction due to the reasonable selection of the composite foaming agent and the foam regulator; (2) the calcium carbonate and the toughener are in proper proportion, so that it is advantageous to enhance the strength, hardness and toughness of the boards; (3) the amount of the stabilizer is optimized, such that the PVC is prevented from being decomposed under adverse conditions, the stability of the product is maintained, the stability of the materials is improved, and the frequency of removing the mould due to the materials being pasted is greatly reduced; and (4) due to the addition of the appropriate lubricant, the workpiece is allowed to have good fluidity during the technological process, so the surface of the workpiece is prevented from being scratched, and the product has the better appearance. By these measures, the boards obtained from the PVC composite material provided by the present invention may improve the quality of the product effectively and finally contribute to hold a larger market share.

According to the requirements of functional characteristics of the above materials, the PVC composite material provided by the present invention may be combined by different formulations, thus to meet the requirements of different products. Table one shows different formulation combinations of the PCV composite material.

TABLE ONE

Formulation combinations of the PCV composite material of the present invention

| Formulation | PVC | Calcium carbonate | Composite forming agent | Foam regulator | Toughener | Lubricant | Stabilizer | Brightening agent |
|---|---|---|---|---|---|---|---|---|
| Combination 1 | 40-60 | 40-60 | 0.2-0.6 | 3-5 | 2-4 | 0.8-1.2 | 2-3 | ≤1.5 |
| Combination 2 | 40-60 | 40-60 | 0.2-0.6 | 3-5 | 2-4 | 0.8-1.2 | 2-3 | 0 |
| Combination 3 | 45-55 | 45-55 | 0.2-0.6 | 3.5-4.5 | 2.5-3.5 | 0.9-1.1 | 2-2.2 | 0 |
| Combination 4 | 48-52 | 48-52 | 0.2-0.6 | 3.6-4.4 | 2.8-3.2 | 0.95-1.05 | 2-2.1 | 0 |
| Combination 5 | 40-60 | 40-60 | 0.2-0.6 | 3-5 | 2-4 | 0.8-1.2 | 2.5-3 | 0.8-1.2 |
| Combination 6 | 45-55 | 45-55 | 0.2-0.6 | 3.5-4.5 | 2.5-3.5 | 0.9-1.1 | 2-3 | 0.9-1.1 |
| Combination 7 | 48-52 | 48-52 | 0.2-0.6 | 3.6-4.4 | 2.8-3.2 | 0.95-1.05 | 2-2.5 | 0.95-1.05 |
| Combination 8 | 50-60 | 40-50 | 0.2-0.6 | 4-5 | 3-4 | 1-1.2 | 2-2.5 | 1-1.2 |
| Combination 9 | 55-60 | 40-45 | 0.2-0.6 | 4.5-5 | 3.5-4 | 1.1-1.2 | 2.2-2.5 | 1.1-1.2 |
| Combination 10 | 56-58 | 42-44 | 0.2-0.6 | 4.6-4.8 | 3.6-3.8 | 1.15-1.2 | 2.35-3 | 1.15-1.2 |

The components of the PVC composite material in Table one have the following characteristics. PVC and the calcium carbonate are used as main materials, and the content of PVC is generally greater than that of the calcium carbonate. The composite forming agent, the foam regulator, the toughener, the lubricant, and the stabilizer are used as supplementary materials, and their total amount is equivalent to 10%-15% of the main materials. The brightening agent is an optional component and is generally used when there are requirements for the color of the materials. The plant fibers are not listed and may be added according to the requirements of the product.

All the above formulation combinations can achieve waterproof and sound reductions, and are further described as below by specific embodiments.

Embodiment One

The PVC composite material includes 50 parts by weight of PVC, 50 parts by weight of heavy calcium carbonate, 0.5 part by weight of composite foaming agent (0.15 parts by weight of sodium bicarbonate and 0.35 parts by weight of AC), 4 parts by weight of foam regulator ZD530, 3 parts by weight of toughener CPE, 1 part by weight of lubricant (0.5 parts by weight of stearic acid and 0.5 parts by weight of PE wax), 2 parts by weight of stabilizer (1 part by weight of calcium stearate and 1 part by weight of zinc stearate), 1 part by weight of brightening agent, and no any supplementary materials such as plant fiber. The compositions in this embodiment are proportioned at a median value, and comparatively neutral (with respect to other embodiments) high-quality products can be thus obtained. The shore hardness of the PVC foam board made by foaming of the PVC composite material in this embodiment is larger than that of the PVC foam board made by foaming of the PVC composite material adopting 50 parts by weight of light calcium carbonate by 3-4 degrees.

Embodiment Two

The PVC composite material includes 60 parts by weight of PVC, 60 parts by weight of calcium carbonate, 0.2 part by weight of composite foaming agent (0.1 parts by weight of sodium bicarbonate and 0.1 parts by weight of AC), 4 parts by weight of foam regulator ZD530, 3 parts by weight of toughener ACR, 1 part by weight of lubricant (0.5 parts by weight of stearic acid and 0.5 parts by weight of PE wax), 2 parts by weight of stabilizer (1 part by weight of calcium stearate and 1 part by weight of zinc stearate), no any brightening agent, and no supplementary materials such as plant fiber. As no any brightening agent is added in this embodiment, the PVC composite material can be adapted to applications such as flooring cores and substrates.

Embodiment Three

The PVC composite material includes 55 parts by weight of PVC, 45 parts by weight of calcium carbonate which is a mixture of the heavy calcium carbonate and the light calcium carbonate, 0.4 parts by weight of composite foaming agent (0.25 parts by weight of sodium bicarbonate and 0.15 parts by weight of AC), 4.5 parts by weight of foam regulator ZD530, 3.3 parts by weight of toughener ACR, 1.1 parts by weight of lubricant (0.5 parts by weight of stearic acid and 0.6 parts by weight of PE wax), 2.1 parts by weight of stabilizer (1 part by weight of calcium stearate and 1.1 parts by weight of zinc stearate), no any brightening agent, and no supplementary materials such as plant fiber. As the proportion of PVC is significantly higher than that of the calcium carbonate, the PVC composite material has excellent toughness and slightly higher strength than that prepared in the above embodiments.

Embodiment Four

The PVC composite material includes 40 parts by weight of PVC, 42 parts by weight of calcium carbonate, 0.3 part by weight of composite foaming agent (0.2 parts by weight of sodium bicarbonate and 0.1 parts by weight of AC), 4 parts by weight of foam regulator ZD530, 2 parts by weight of toughener ACR, 0.8 part by weight of lubricant (0.4 parts by weight of stearic acid and 0.4 parts by weight of PE wax), 2 parts by weight of stabilizer (1 part by weight of calcium stearate and 1 part by weight of zinc stearate), no any brightening agent, and no supplementary materials such as plant fiber. As a proper amount of the foam regulator ZD530 is used in this embodiment, the PVC composite material has a satisfied foaming effect and the better muff effect.

Embodiment Five

The PVC composite material includes 60 parts by weight of PVC, 40 parts by weight of calcium carbonate, 0.6 parts by weight of composite foaming agent (0.2 parts by weight of sodium bicarbonate and 0.4 parts by weight of AC), 5 parts by weight of foam regulator ZD530, 4 parts by weight of toughener CPE, 1.2 parts by weight of lubricant (0.6 parts by weight of stearic acid and 0.6 parts by weight of PE wax), 3 parts by weight of stabilizer (1.5 parts by weight of calcium stearate and 1.5 parts by weight of zinc stearate), 0.9 parts by weight of titanium oxide, and no supplementary materials such as plant fiber. As the proportion of PVC in this embodiment is relatively large, the PVC composition material has superior toughness. Further, the proportion of the calcium carbonate is reduced, and the intensity of the PVC board is improved.

Embodiment Six

The PVC composite material includes 52 parts by weight of PVC, 48 parts by weight of calcium carbonate, 0.3 part by weight of composite foaming agent (0.2 parts by weight of sodium bicarbonate and 0.1 parts by weight of AC), 3 parts by weight of foam regulator ZD530, 2 parts by weight of toughener ACR, 0.8 part by weight of lubricant (0.4 parts by weight of stearic acid and 0.4 parts by weight of PE wax), 2 parts by weight of stabilizer (1 part by weight of calcium stearate and 1 part by weight of zinc stearate), 1.5 parts by weight of titanium oxide, and no supplementary materials such as plant fiber. As a larger amount of brightening agent is added in this embodiment, the PVC composition material has the better appearance.

Embodiment Seven

The PVC composite material includes 51 parts by weight of PVC, 49 parts by weight of calcium carbonate, 0.3 part by weight of composite foaming agent (0.2 parts by weight of sodium bicarbonate and 0.1 parts by weight of AC), 4.2 parts by weight of foam regulator ZD530, 3.2 parts by weight of toughener CPE, 1 part by weight of lubricant (0.5 parts by weight of stearic acid and 0.5 parts by weight of PE wax), 2 parts by weight of stabilizer (1 part by weight of calcium stearate and 1 part by weight of zinc stearate), 3 part by weight of titanium oxide, and 4 parts by weight of wood flour. As the wood flour is added in this embodiment, the PVC composition material has increased strength and toughness.

Embodiment Eight

The PVC composite material includes 58 parts by weight of PVC, 42 parts by weight of calcium carbonate, 0.4 parts by weight of composite foaming agent (0.25 parts by weight of sodium bicarbonate and 0.15 parts by weight of AC), 4 parts by weight of foam regulator ZD530, 3.8 parts by weight of toughener ACR, 1.1 parts by weight of lubricant (0.5 parts by weight of stearic acid and 0.6 parts by weight of PE wax), 2.5 parts by weight of stabilizer (1.2 parts by weight of calcium stearate and 1.3 parts by weight of zinc stearate), 1.1 parts by weight of titanium oxide, and 5 parts by weight of bamboo flour. As the proportion of PVC in this embodiment is relatively large, the PVC composition material added with the bamboo flour has increased toughness and ductility.

Embodiment Nine

The PVC composite material includes 56 parts by weight of PVC, 44 parts by weight of calcium carbonate, 0.4 parts by weight of composite foaming agent (0.25 parts by weight of sodium bicarbonate and 0.15 parts by weight of AC), 4.6 parts by weight of foam regulator PA530, 3.8 parts by weight of toughener ACR, 1.1 parts by weight of lubricant (0.5 parts by weight of stearic acid and 0.6 parts by weight of PE wax), 2.4 parts by weight of stabilizer (1.2 parts by weight of calcium stearate and 1.2 parts by weight of zinc stearate), 1.1 parts by weight of titanium oxide, and 4 parts by weight of straw powder. As the proportion of PVC in this embodiment is relatively large, the PVC composition material added with the straw powder has improved toughness and ductility.

Embodiment Ten

The PVC composite material includes 57 parts by weight of PVC, 43 parts by weight of calcium carbonate, 0.4 parts by weight of composite foaming agent (0.25 parts by weight of sodium bicarbonate and 0.15 parts by weight of AC), 4.6 parts by weight of foam regulator LS530, 3.8 parts by weight of toughener ACR, 1.1 parts by weight of lubricant (0.5 parts by weight of stearic acid and 0.6 parts by weight of PE wax), 2.4 parts by weight of stabilizer (1.2 parts by weight of calcium stearate and 1.2 parts by weight of zinc stearate), 1.1 parts by weight of titanium oxide, and 4 parts by weight of a mixture of bamboo flour and wood flour. As the bamboo flour and the wood flour are mixed in PVC in this embodiment, the PVC composition material has reduced cost while guaranteeing the toughness and strength.

The materials of the PVC composite materials provided by the present invention have been described as above. This composite material contributes to the improvement of the quality of the product. On this basis, by improving the process and apparatus associated in the present invention, the resulting boards and finished products have better quality, as further described below.

The PVC foam boards provided by the present invention are made by foaming of the PVC composite material described above. The specific process (sometimes referred to as production method, with the same meaning) of the PVC foam boards is briefly described as below.

The PVC foam boards provided by the present invention are made by foaming of the PVC composite material described above. The specific process (sometimes referred to as production method, with the same meaning) of the PVC foam boards is briefly described as below.

To better understand the technical principle and working process of the present invention, the present invention is further described as below in details with reference to accompanying drawings and specific embodiments.

Referring to FIG. 1, a flowchart of a production method of PVC foam boards according to one embodiment of the present invention is shown, mainly including the following steps S110-S140 specifically.

Step S110: A step of uniformly mixing and stirring materials forming the PVC composite material (with components as described above). Specifically, two times of mixing, i.e., mixing at a low speed and mixing at a high speed, are provided. The first time of mixing is to stir at a high speed of 1000-1200 r/min, thus to facilitate all raw materials to be mixed uniformly. The second time of mixing is to stir at a low speed of 500-600 r/min, thus to realize cooling while further mixing. The product obtained after the two times of mixing is greatly improved in both density and stability.

Step S120: A step of extruding and discharging including heating and foaming the uniformly mixed materials forming the PVC composite material, and then extruding viscous foamed PVC extrudate. Generally, this step may be performed in an extruder. The heating and foaming temperature is 160° C.-190° C. Whereby, the materials are fused and plasticized to be viscous, and then are extruded smoothly under an external force and finally are fed into a mold continuously for shaping.

Step S130: A step of shaping and cooling including feeding the foamed PVC extrudate into a mold for shaping and cooling in order to obtain PVC foam profiles. In this step, two times of shaping and cooling processes are provided. Specifically a secondary shaping process. i.e., a step of heating for shaping and cooling, is added on the basis of the existing process. As a result, cracks, hunches and other quality defects resulted from the change in the shrinkage ratio of the upstream process are avoided effectively.

In step S130, the two times of shaping and cooling are specifically described as follows.

The first time of shaping and cooling (step S131): feeding the foamed PVC extrudate into a mold having a predetermined shape and size for shaping and keeping thickness, and then cooling to obtain PVC foam board blanks (the cooling temperature is 20° C.-40° C.). The cooled PVC foam board blanks may be stretched to a certain extent, so that the PVC foam board blanks may be fed into a next procedure for secondary shaping under the traction of a traction apparatus, thus to reduce the shrinkage ratio.

The second time of shaping and cooling (step S132) actually includes two processes, i.e., heating for shaping and cooling (they may be separately performed in different devices, or performed in the same device in turn), specifically: heating for shaping the PVC foam board blanks (heating for shaping the blanks at 75° C.-85° C. for 2-3 mins), cooling again to obtain PVC foam profiles that meet the properties of corresponding products (the cooling temperature is 20° C.-40° C.), and dragging the cooled PVC foam profiles into a cutting procedure to obtain the finished products.

The PVC foam profiles obtained after two times of shaping and cooling in step S131 and step S132 have little deformation. The PVC foam profiles have a shrinkage ratio of 0.25%-1.0% when detected at 80° C. for 6 h. Therefore, the quality of the products may be improved greatly.

It is appreciated that each process of the present invention as shown in FIG. 1 may achieve heating or cooling required by the above technological parameters in various ways. A combination way is: the way of heating and foaming PVC materials and the way of heating and shaping PVC foam board blanks are water heating, oil heating, or heating with resistor medium; and the way of cooling PVC foam board blanks and the way of cooling PVC foam profiles are air cooling, water cooling, or natural cooling. Certainly, this technology may also employ other heating and cooling combination ways, and the other heating and cooling combination ways are not repeated here.

It is to be pointed out that, the first time of shaping (cooling for shaping, i.e., the step of feeding into a mold for shaping and cooling) and the second time of shaping (heating for shaping, i.e., the step of heating for shaping and cooling) in the technological process shown in FIG. 1 are performed on respective shaping tables without mutual interference. It is appreciated that there may be no shaping tables used in the technological process, or the shaping tables are used only during feeding into a mold for shaping and heating for shaping but not during the two times of cooling. Specifically, in the technological process, corresponding materials may be continuously conveyed in a way of twice traction, where the first traction is set after a cooling and shaping station while the second traction is set prior to a discharging station, and the speed of the first traction (the traction of the PVC foam board blanks) is slightly less than that of the second traction of the PVC foam profiles (the speed difference between the both is approximately equal to 0.25%-1.0% of the shrinkage ratio). Thus, the long distance and deformation defects of the materials in a deterministic state may be overcome by the two times of traction, further to improve the quality of the product.

During the production process of PVC foam boards in this embodiment, the boards stretched by the first time of traction are performed with secondary shaping. Then deformation of the boards after the first time of traction is reduced by two operations of heating first and then cooling, and then, the boards obtained after the second time of shaping are performed with secondary traction. Thereby the obtained boards have little deformation, and the shrinkage ratio and bend curvature of the boards are also reduced obviously, so that it is advantageous to improve the quality of the product. Step S140: a step of production of finished products including cutting discharged PVC foam profiles to finally obtain PVC foam boards as finished products.

According to the production method of PVC foam boards shown in FIG. 1, a complete set of production apparatus of PVC foam boards may be contemplated correspondingly, and is described as below in details. It is to be pointed out that, if there are incomplete descriptions for the production apparatus in this embodiment, please refer to the content of the foregoing technology; similarly, if the foregoing technology involves in the related apparatus, refer to the content described below.

Figure 2:
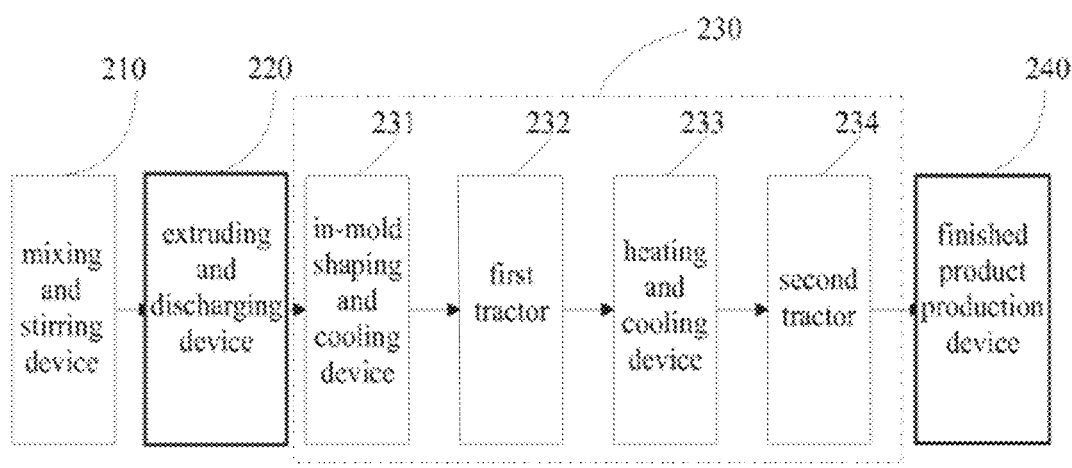
FIG. 2 is a system diagram of a production apparatus of PVC foam boards according to one embodiment of the present invention.

Referring to FIG. 2, a system diagram of a production apparatus of PVC foam boards according to one embodiment of the present invention is shown. In FIG. 2, the arrows represent from workpieces (materials) to a delivery direction. The production apparatus of PVC foam boards in this embodiment includes a mixing and stirring device 210, an extruding and discharging device 220, a shaping and cooling device 230, a finished product production device 240, and etc., which are arranged in a order of delivering the workpieces.

The mixing and stirring device 210 is configured to uniformly mix and stir the materials forming the PVC composite material. Specifically, the forgoing two times of mixing. i.e., mixing at a low speed and mixing at a high speed, may be utilized to improve the density and stability of the product.

The extruding and discharging device 220 may be specifically an extruder, and configured to heat and foam the mixed materials forming the PVC composite material and then extrude viscous foamed PVC extrudate.

The shaping and cooling device 230 is configured to feed the foamed PVC extrudate into a mold for shaping and cooling to obtain PVC foam profiles. As shown in FIG. 2. the shaping and cooling device 230 specifically includes an in-mold shaping and cooling device 231, a first tractor 232. a heating and cooling device 233, and a second tractor 234. The in-mold shaping and cooling device 231 (may be of an integral or a split structure) is configured to feed the foamed PVC extrudate into a mold having a predetermined shape and size for shaping and keeping thickness and then cool to obtain the PVC foam board blanks. The first tractor 232 is configured to stretch the cooled PVC foam board blanks to a certain extent, and then feed them into a next procedure for secondary shaping. The heating and cooling device 233 may also be of an integral or a split structure and configured to heat the PVC foam board blanks for shaping, and then cool to obtain the PVC foam profiles that meet the properties of a corresponding product. The second tractor 234 is configured to drag the cooled PVC foam profiles to a cutting procedure for processing.

The finished product production device 240 may be specifically a known cutting machine for cutting the discharged PVC foam profiles to finally obtain PVC foam boards as finished products.

In this embodiment, there are the first tractor 232 and the second tractor 234. The traction speed of the first tractor 232 is slightly less than that of the second tractor 234. The specific positions of the both are described here. The first tractor 232 is disposed on a station between the in-mold shaping and cooling device 231 and the heating and cooling device 233 to drag the PVC foam board blanks, while the second tractor 234 is disposed on a station between the heating and cooling device 233 and the finished product production device 240 to drag the PVC foam profiles. It is appreciated that the first tractor 232 and the second tractor 234 may also be disposed on other proper stations. Of course, they may also be replaced with other types of conveyors (for example, friction conveyors, etc.), and are not repeated here. In this embodiment, the shrinkage ratio and bend curvature during the production process of the core boards are reduced by two times of shaping, so that the product quality of the PVC foam boards may be improved. It is appreciated that, to better ensure the product yield, the present invention should reasonably adjust technological parameters and apparatus types according to the requirements of the product. The following is a preferred application example.

In the embodiment of the production apparatus of PVC foam boards, the cooling for shaping and the heating for shaping are performed on respective shaping tables (according to the technological requirements, there may also be no shaping tables, or the shaping tables are used just in part). The heating may be heating with water, oil, resistor medium, or in other ways, while the cooling is cooling with cooling water, natural cooling, or other ways. Preferred technological parameters are as follows: (1) extruding and discharging: feeding PVC materials into an extruder, heating, forming and extruding, where the temperature of heating and foaming is controlled at 180° C.; (2) feeding into a mold and shaping: feeding the extrudate into a mold for shaping and keeping thickness: (3) cooling for shaping: performing the first time of cooling and shaping to the de-molded extrudate, where the temperature of cooling and shaping is 30° C.; (4) one time of traction: dragging the cooled and shaped extrudate via the first tractor: (5) heating for shaping: heating the cooled and shaped base material again and shaping for 2-3 mins at 75-85° C.; (6) dragging and discharging: cooling the heated and shaped extrudate to 30° C., and discharging the materials under the traction of the second tractor.

Such apparatus section and technological parameters may reduce the shrinkage ratio and bend curvature during the production process of the core boards. so that it is advantageous to improve the product quality of the PVC foam boards. In the prior art. during the traction and cooling of the materials, the shape (including thickness and height) of the extrudate being hot may be changed, so that it is likely to result in a high rage of the change of the shrinkage ratio during the subsequent procedures. However, in this embodiment, the materials are heated and cooled again for shaping after cooled for shaping, so that the core boards formed by the secondary shaping can effectively avoid cracks, hunches and other problems resulted from the change in the shrinkage ratio.

The above PVC foam boards may be applied to floorings. The following describes an example of floorings with waterproof and sound reductions.

Figure 3:
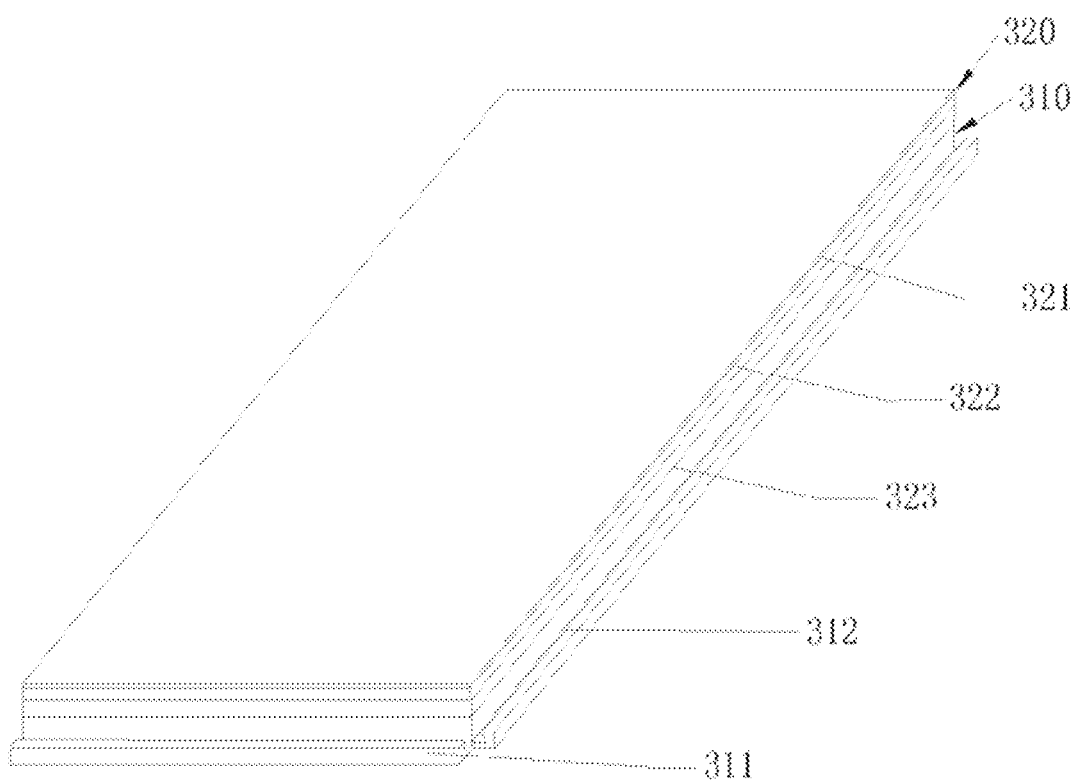
FIG. 3 is a structure diagram of flooring according to one embodiment of the present invention.

Referring to the FIG. 3, a structure diagram of flooring according to one embodiment of the present invention is shown. The flooring includes a PVC foam layer (board) 310 as a substrate and a PVC layer 320 adhered above the PVC foam layer 310. The PVC foam layer 310 is 4-5 mm in thickness, and is provided with end buckles 311 and side buckles 312 (there many combination ways of the buckles, for example, making the front buckle of the flooring upward, the front buckle downward, the left buckle downward, and the right buckle downward), to be in seamless connection to adjacent floorings. The PVC foam layer 310 is formed by foaming the foregoing PVC composite material, and has a good sound reduction, and good strength, hardness and toughness. The quality and service life of the product are improved greatly. To achieve waterproof, wear resistance and other performances, the PVC layer 320 can be formed by a PVC wear-resistance layer (film) 321, a PVC color film layer 322, and a PVC substrate layer 323 by hot pressing from top to bottom. The PVC color film layer 322 is about 0.1 mm in thickness, and is printed thereon with flooring patterns to improve the aesthetic sense of the flooring. The PVC wear-resistance layer 321 is about 0.3-0.5 mm in thickness and covers on the PVC color film layer 322 to prevent the PVC color film layer 322 from being scratched and also to achieve the waterproof effect. The PVC substrate layer 323 is about 1.2-2 mm in thickness, and is hot-pressed together with the PVC color film layer 322 and the PVC wear-resistance layer 321 and then bonded to the PVC foam layer 310. Calcium carbonate or other analogues may be added into the PVC substrate layer 323 to improve the strength and hardness and thus to improve the quality of the flooring. Due to the use of the forgoing PVC composite materials, the flooring may effectively improve properties of the product, which is advantageous to hold a large market share.

In other embodiments, the flooring can further include an underlayer 330 disposed at the surface of the PVC foam layer 310 far from the PVC layer 320, i.e., the surface is the one contacting the installing surface, thereby improving the moisture proof and sound reduction performance of the flooring. Via the underlayer 330 disposed at the back side of the PVC foam layer 310, an additional muting moisture proof pad is not needed to be laid out at first when the flooring is installed. The flooring in this embodiment can be laid out directly, thereby significantly facilitating and speeding the installation operation. However, the invention is not limited thereto. In other embodiments, the flooring can remove the underlayer 330. In actual use, the underlayer 330 can be rubber pad or cork pad.

The PVC substrate layer 323 in the above embodiment may also be removed during manufacturing the flooring. In this case, the PVC color film layer 322 is bonded to the PVC foam layer 310. Generally, in the case of not using the PVC substrate layer 323, the thickness of the PVC foam layer 310 may be increased slightly. The adhesion and hot-pressing process between different layers of the flooring may refer to the prior art, and may not be repeated here.

The present invention further relates to the following embodiments.

A production method of polyvinyl chloride polymer foam boards, comprising:
a step of uniformly mixing and stirring materials forming the polyvinyl chloride polymer composite material as disclosed herein;
a step of extruding and discharging comprising heating and foaming the uniformly mixed materials forming the polyvinyl chloride polymer composite material and then extruding viscous foamed polyvinyl chloride polymer extrudate:
a step of shaping and cooling comprising feeding the foamed polyvinyl chloride polymer extrudate into a mold for shaping and cooling in order to obtain polyvinyl chloride polymer foam profiles; and
a step of production of finished products comprising cutting the discharged polyvinyl chloride polymer foam profiles to finally obtain polyvinyl chloride polymer foam boards as finished products.

A production apparatus of polyvinyl chloride polymer foam boards, comprising:
a mixing and stirring device, configured to uniformly mix and stir the materials forming the polyvinyl chloride polymer composite material as disclosed herein;
an extruding and discharging device, configured to heat and foam the uniformly mixed materials forming the polyvinyl chloride polymer composite material and then extrude viscous foamed polyvinyl chloride polymer extrudate:
a shaping and cooling device, configured to feed the foamed polyvinyl chloride polymer extrudate into a mold for shaping and cooling in order to obtain polyvinyl chloride polymer foam profiles; and
a finished product production device, configured to cut the discharged polyvinyl chloride polymer foam profiles to finally obtain polyvinyl chloride polymer foam boards as finished products.

Flooring, comprising:
a polyvinyl chloride polymer layer; and
a polyvinyl chloride polymer PVC foam layer, the polyvinyl chloride polymer foam layer being made by foaming of the polyvinyl chloride polymer composite material as disclosed herein, the polyvinyl chloride polymer layer being bonded on the surface of the polyvinyl chloride polymer foam layer.

In a preferred embodiment of the flooring, the polyvinyl chloride polymer layer comprises a hot-pressed polyvinyl chloride polymer wear-resistance layer and a polyvinyl chloride polymer color film layer;
wherein the polyvinyl chloride polymer color film layer is bonded to the polyvinyl chloride polymer foam layer, or
wherein the polyvinyl chloride polymer color film layer is hot-pressed onto a polyvinyl chloride polymer substrate layer and the polyvinyl chloride polymer substrate layer is bonded to the polyvinyl chloride polymer foam layer.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:
1. A flooring, comprising:
a polyvinyl chloride polymer wear-resistance layer;

a polyvinyl chloride polymer color film layer connected directly to the polyvinyl chloride polymer wear-resistance layer;

a polyvinyl chloride polymer substrate layer connected directly to the polyvinyl chloride polymer color film layer; and a polyvinyl chloride polymer foam layer connected directly to the polyvinyl chloride polymer substrate layer, the polyvinyl chloride polymer foam layer being made by foaming of a polyvinyl chloride polymer composite material;

an underlayer disposed at one surface of the polyvinyl chloride polymer foam layer opposite the polyvinyl chloride polymer substrate layer wherein the underlayer comprises a cork pad;

wherein the polyvinyl chloride polymer color film layer is hot-pressed onto the polyvinyl chloride polymer substrate layer and the polyvinyl chloride polymer substrate layer is bonded to the polyvinyl chloride polymer foam layer; and wherein the polyvinyl chloride polymer composite material comprises:

40-60 parts by weight of polyvinyl chloride polymer;
40-60 parts by weight of calcium carbonate;
0.2-0.6 parts by weight of composite foaming agent;
3-5 parts by weight of foam regulator;
2-4 parts by weight of toughener;
0.8-1.2 parts by weight of lubricant; and
2-3 parts by weight of stabilizer, wherein the polyvinyl chloride polymer foam layer is free of plant fibers;

wherein the polyvinyl chloride polymer foam layer has a density greater than 0.8 g/cm$^3$;

wherein the stabilizer comprises calcium stearate and zinc stearate in substantially equal amounts; wherein the polyvinyl chloride color film layer is in the form of a single layer.

2. The flooring according to claim 1, wherein the polyvinyl chloride polymer composite material comprises:

45-55 parts by weight of the polyvinyl chloride polymer;
45-55 parts by weight of the calcium carbonate;
0.2-0.6 parts by weight of the composite foaming agent;
3.5-4.5 parts by weight of the foam regulator;
2.5-3.5 parts by weight of the toughener;
0.9-1.1 parts by weight of the lubricant; and
2-3 parts by weight of the stabilizer.

3. The flooring according to claim 1, wherein the polyvinyl chloride polymer composite material comprises:

50-60 parts by weight of the polyvinyl chloride polymer;
40-50 parts by weight of the calcium carbonate;
0.2-0.6 parts by weight of the composite foaming agent;
4-5 parts by weight of the foam regulator;
3-4 parts by weight of the toughener; 1-1.2 parts by weight of the lubricant; and
2-2.5 parts by weight of the stabilizer.

4. The flooring according to claim 1, wherein the polyvinyl chloride polymer composite material in addition comprises:

a brightening agent, an amount of the brightening agent being no more than 1.5 parts by weight.

5. The flooring according to claim 4, wherein an inorganic foaming agent of the composite foaming agent is sodium bicarbonate, wherein an organic foaming agent of the composite foaming agent is azodicarbonamide, wherein the toughener is chlorinated polyethylene or polyacrylates, wherein the lubricant comprises stearic acid and polyethylene wax, and wherein the brightening agent is titanium oxide.

6. The flooring according to claim 1, wherein the polyvinyl chloride polymer layer and the polyvinyl chloride polymer foam layer are discretely formed as definitive layers.

7. The flooring according to claim 6, wherein the polyvinyl chloride polymer layer has a thickness of 1.6 mm to 2.6 mm, and the polyvinyl chloride polymer foam layer has a thickness of 4 to 5 mm.

8. The flooring according to claim 1, wherein the polyvinyl chloride polymer layer has a thickness of 1.6 mm to 2.6 mm, and the polyvinyl chloride polymer foam layer has a thickness of 4 to 5 mm.

* * * * *